United States Patent [19]

Shuert

[11] Patent Number: 4,550,830

[45] Date of Patent: Nov. 5, 1985

[54] PALLETIZED CONTAINER

[76] Inventor: Lyle Shuert, 817 N. Fieldstone, Rochester, Mich. 48063

[21] Appl. No.: 662,548

[22] Filed: Oct. 19, 1984

Related U.S. Application Data

[63] Continuation of Ser. No. 442,350, Nov. 11, 1984.

[51] Int. Cl.$^4$ ............................................. B65D 19/18
[52] U.S. Cl. ....................................... 206/386; 108/55.1
[58] Field of Search ............... 206/598, 599, 600, 386, 206/517, 518; 220/4 R, 4 F, 4 A, 76; 229/33, 35, 45 R, 15; 217/43 A; 108/901, 902, 53.1, 53.5, 55.1, 55.3, 56.1, 56.5

[56] References Cited

U.S. PATENT DOCUMENTS

| | | | |
|---|---|---|---|
| 2,077,588 | 4/1937 | Schaefer | 229/15 |
| 2,409,701 | 10/1946 | Loth | 229/15 |
| 2,706,595 | 4/1955 | Fallert | 229/45 |
| 2,875,942 | 3/1959 | Wilson | 229/35 |
| 2,893,588 | 7/1959 | Martin | 220/4 F |
| 3,047,183 | 7/1962 | Papa | 220/4 F |
| 3,221,921 | 12/1965 | Silverman | 220/1.5 X |
| 3,228,358 | 1/1966 | Sepe et al. | 108/901 X |
| 3,480,196 | 11/1969 | De Simas | 108/51.3 |
| 3,540,613 | 11/1970 | Hudson, Jr. | 220/4 F |
| 3,589,548 | 6/1971 | Weiss | 220/4 F |
| 3,664,570 | 5/1972 | Kuperswet | 108/55.1 X |
| 3,763,791 | 10/1973 | Wilcox, Jr. | 108/51.3 |
| 3,797,691 | 3/1974 | Williams, Jr. | 220/1.5 |
| 3,993,211 | 11/1976 | Astle | 220/1.5 |
| 4,084,720 | 4/1978 | Thurston | 220/76 |
| 4,146,167 | 3/1979 | Paseus | 229/35 |
| 4,254,873 | 3/1981 | Cook, III et al. | 206/599 |
| 4,413,737 | 11/1983 | Wind | 206/599 |
| 4,480,748 | 11/1984 | Wind | 206/386 |

FOREIGN PATENT DOCUMENTS

| | | | |
|---|---|---|---|
| 2387850 | 12/1978 | France | 206/386 |
| 2114541 | 8/1983 | United Kingdom | 206/386 |

Primary Examiner—Allan N. Shoap
Assistant Examiner—Bryon Gehman
Attorney, Agent, or Firm—Krass & Young

[57] ABSTRACT

A reusable plastic base serves as a pallet which may be lifted by the skids of a forklift truck. A sleeve is removably attached to the base and forms the side walls of the container. In the preferred embodiment, the sleeve is made of corrugated material having tabs formed along its lower edge. The tabs are adapted to pass through slots in the base and be folded underneath the base to hold the components together. The base is preferably designed with a peripheral groove lying substantially at floor level to receive the edge of the sleeve. Compressive loads applied to the container are transferred by the sleeve directly to the floor thereby minimizing deformation of peripheral portions of the base.

23 Claims, 11 Drawing Figures

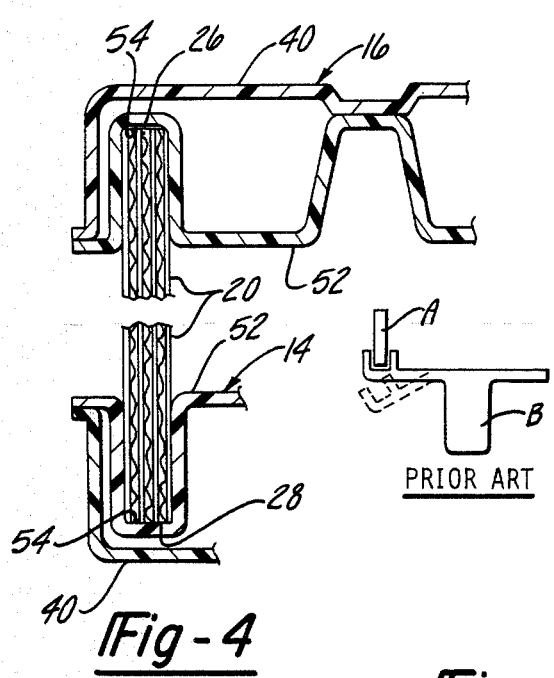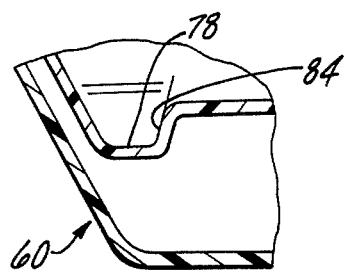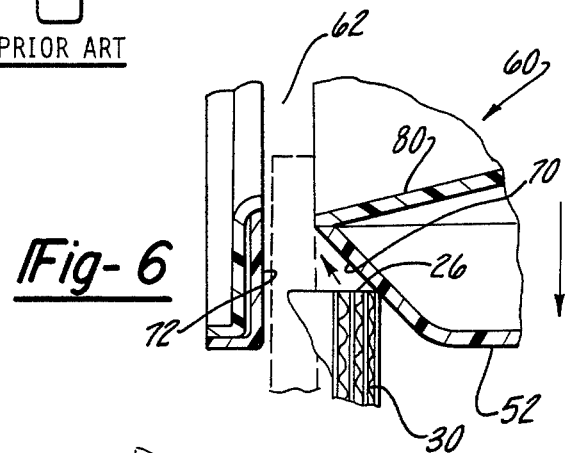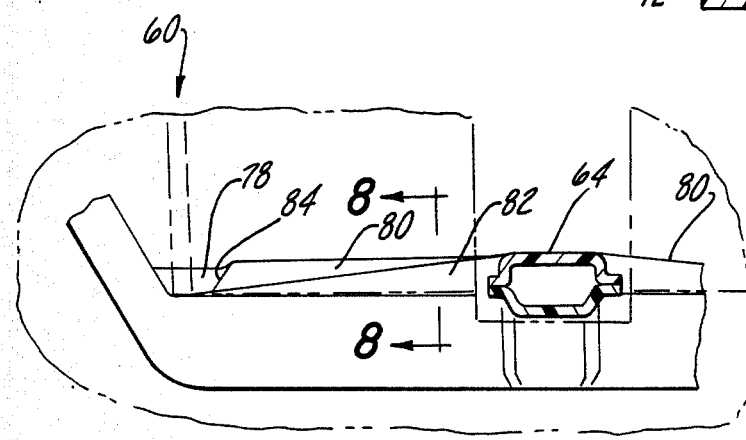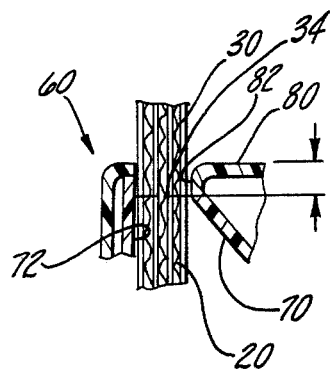

PALLETIZED CONTAINER

This application is a continuation of application Ser. No. 442,350 filed Nov. 11, 1984.

TECHNICAL FIELD

This invention relates to shipping and storage containers. More particularly, it relates to containers in which the base thereof serves as a reusable pallet.

BACKGROUND ART

Various container designs have been employed to ship and store industrial goods. In many instances the containers are stored in large warehouse facilities where they are moved from one location to another by forklift trucks or the like. One commonly used container incorporates a corrugated sleeve which is nailed to a conventional wooden pallet. The sleeve forms the side walls of the container and the pallet serves as its bottom. The use of the wooden pallets, however, has some drawbacks. For example, they are subject to be broken and thus, are not reuseable over an extended period of time. Wooden pallets also taken up a considerable amount of valuable floor space in the warehouse when they are not currently in use.

In an effort to solve some of the problems with the wooden pallets, reusable plastic pallets have been employed with some degree of success. Such pallets have been combined with corrugated sides and a plastic cover to form a container. The plastic pallet and cover are reusable and may be more compactly stacked when not in use thereby providing significant advantages over the use of conventional wooden pallets. U.S. Pat. No. 4,254,873 to Cook, III et al is a representative example of such a composite container design.

These composite container designs also have their drawbacks. The edges of the sleeve merely rest in grooves in the pallet and cover in most of the known designs. Consequently, some additional means must be provided to hold them together prior to shipping. Generally, the pallet, corrugated sleeve and cover are banded together by steel bands or cords encircling the three components. This banding process introduces an additional expense in both time and money since the container must not only be bound prior to shipping but it also must be unbound before the container's contents can be removed.

As noted before, warehouse space is valuable. It is therefore desirable to be able to stack these composite containers on top of one another in order to conserve space. In such instances the lower containers often experience substantial compressive forces from the weight of the upper containers. These compressive forces are generally transferred by the sides of the container downwardly to the peripheral edges of the pallet. In the majority of the known plastic pallets, legs or spacers providing clearance for the skids of the forklift are spaced inwardly of the peripheral edges of the pallet experiencing the compressive loads. The drawing labeled "Prior Art" shows a simplified cross-sectional view of a corner of such a construction. As shown in the dotted lines therein, the compressive loads applied via sleeve A are often sufficient enough to deform the peripheral portions of the pallet outside of the leg B which rests on the supporting surface such as the floor. Such deformation may damage the pallet to such an extent that it is not readily reusable. The structural rigidity of these pallets may be enhanced by using more plastic material or by using special reinforcing means but such measures unduly increase manufacturing costs.

The present invention is directed to solving one or more of these problems.

SUMMARY OF THE INVENTION

There are several inventive features disclosed in this patent which may be used alone or in combination. One feature is the provision of a container employing a base and a removable sleeve providing side walls for the container. The sleeve includes a plurality of tabs formed at spaced points along its edge. These tabs are aligned with slots formed in peripheral portions of the base. The tabs are adapted to pass through the slots and be folded underneath the base to securely hold the sleeve on the base. In the preferred embodiment, the base is made of plastic and the sleeve is made of corrugated material. The base is also formed with indentations which serve to receive the skids of a forklift or the like so that the base may function as a pallet.

A cover may optionally be provided for the container. The cover is preferably a mirror image of the base and is removably attached to the sleeve in an identical manner.

Another feature of this invention is that the base includes means lying in substantially the same plane as the bottom surface of the base for receiving the lower edges of the sleeve. The skid receiving indentations in the base are located inboard and above at least the corner edges of the sleeve. Accordingly, downward compressive loads applied to the container are transferred by the sleeve substantially directly to the supporting surface thereby minimizing deformation of peripheral portions of the base. Another feature is the design of the sleeve for use with the pallet.

BRIEF DESCRIPTION OF THE DRAWINGS

Various other advantages of the present invention will become apparent to one skilled in the art upon reading the following specification and by reference to the drawings in which:

FIG. 4 is a partial cross-sectional view along the lines 4—4 of FIG. 3 including a side wall of the sleeve whose edges are located in peripheral grooves in the base and cover;

FIG. 5 is a partial cross-sectional view along the lines 5—5 of FIG. 3;

FIG. 6 is a partial cross-sectional view along the lines 6—6 of FIG. 3 illustrating the ramping action of portions of the cover on bent tabs of the sleeve as the cover is placed thereon;

FIG. 7 is a partial cross-sectional view along the lines 7—7 of FIG. 3;

FIG. 8 is a partial cross-sectional view along the lines 8—8 of FIG. 7 including a tab of the sleeve in the slot of the tab attachment portion of the cover;

DESCRIPTION OF THE PREFERRED EMBODIMENT

Figure 1:
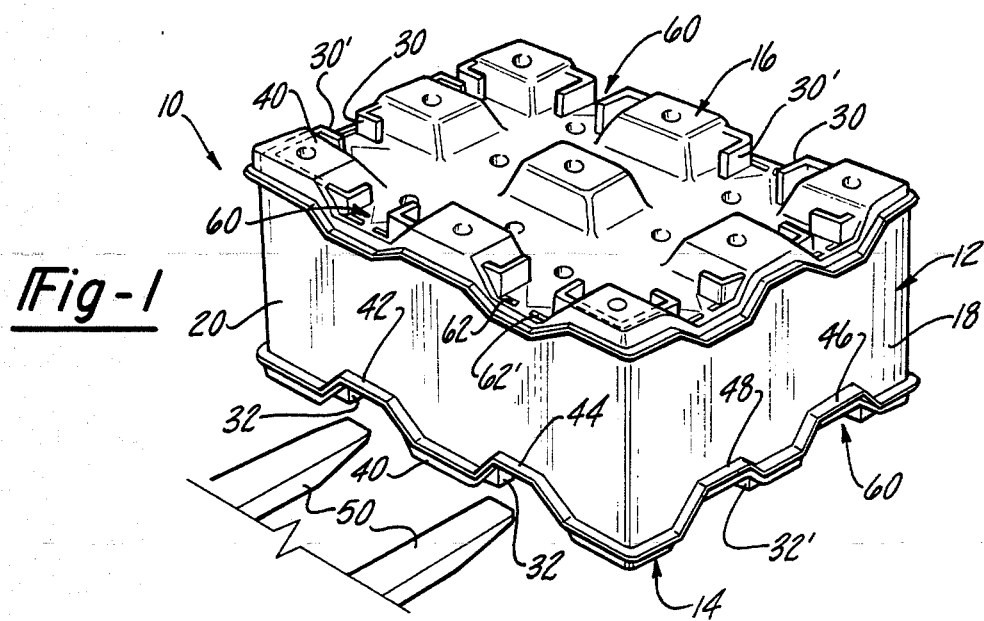
FIG. 1 is a perpsective view of a container made in accordance with the preferred embodiment of the invention.
Figure 2:
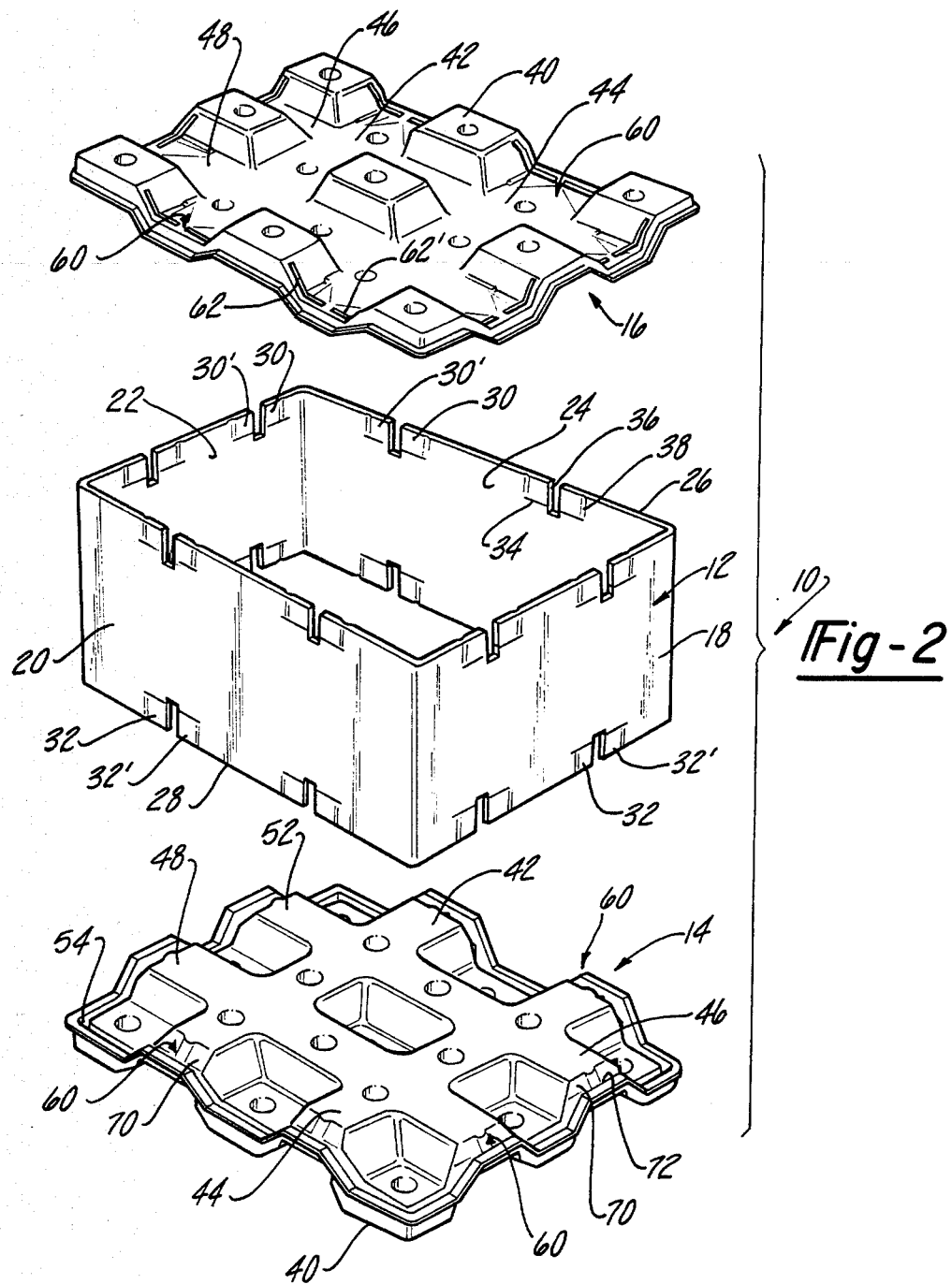
FIG. 2 is an exploded perspective view of the container.

FIGS. 1 and 2 illustrate a container 10 made in accordance with the preferred embodiment of this invention. Container 10 is of a composite design employing a sleeve 12 removably attached to a base 14 and cover 16. Sleeve 12 takes the form of an open ended rectangular box providing side walls 18, 20, 22 and 24 for the container 10. In this embodiment, sleeve 12 is formed of three ply panels of corrugated material such as is commercially available from Tri-Wall Containers, Inc. Corrugated material for sleeve 12 is preferred because it is relatively inexpensive, is easy to form foldable tabs therein as will be explained, and can be collapsed when not in use. At the same time, the preferred corrugated sleeve exhibits comparatively good strength characteristics. However, it should be understood that various other suitable materials could be used for sleeve 12.

The top edge 26 and bottom edge 28 of sleeve 12 each include a plurality of spaced pairs of tabs 30, 30' and 32, 32', respectively. These tabs are conveniently formed by cutting the corrugated sleeve along a horizontal line 34 and cutting a vertical notch 36 therein. The tabs are thus capable of being folded horizontally about fold line 38. As can be seen most clearly in FIGS. 1 and 9-11, the tabs are adapted to be folded at about a 90 degree angle towards the middle of the container 10 to thereby securely attach sleeve 12 to the base 14 and cover 16.

In the preferred embodiment, base 14 and cover 16 are mirror images of one another. In other words, they are identical except that the cover 16 has been flipped over 180 degrees with respect to the base 14. Base and cover 14 are preferably made of plastic and thus, the same mold may be used to make both of the structures. In this embodiment, the base and cover are made by vacuum forming sheets of organic polymeric material such as polyethylene. They are both made of a twin sheet construction employing two skins which are fused or knitted together at various points to aid in structural rigidity. However, it should be noted that various plastic materials and other formation techniques such as injection molding, rotocasting and the like may be alternately employed.

Since the base 14 and the cover 16 are identical and same reference numerals will be used to refer to common elements. For ease of description some of these elements will be described in connection with the base 14 whereas others will be described in connection with the cover 16. For example, it is easier to describe the tab attachment arrangement with respect to the cover 16 due to the layout of the drawings. However, it should be understood that the same construction is employed in the base 14.

Beginning then with reference to base 14, it is provided with an flat lower or outer face 40 configured so that at least the corners thereof lie on the supporting surface such as the floor for the container. A plurality of elongated indentations 42-48 displaced from the plane of face 40 criss cross in the middle of base 14 and terminate on the sides thereof. As can be seen most clearly in FIG. 1, these indentations 42-48 provide relieved access areas for receiving the skids 50 of a forklift truck or the like. As a consequence, the base 14 may serve as a pallet for the container 10 which may be lifted and moved by conventional warehousing equipment.

Peripheral portions of the upper or inner face 52 of base 40 are provided with a groove 54 for receiving the edges of sleeve 12. It is important to note that the bottom of groove 54 extends downwardly substantially the same level as outer face 40 as can be seen most clearly in FIG. 4. This allows the bottom edge 28 of sleeve 12 to terminate substantially at ground level. This is in contrast with the prior art design shown in the drawing where the edge of the sleeve A terminates above floor level because of the design of leg B. In the present design compressive forces applied downwardly to the container 10 are transferred via the sleeve 12 substantially directly to the floor or other supporting surface. As a consequence, the deformation problem associated with the shown prior art design is effectively eliminated without a substantial increase in manufacturing costs.

The sides of the skid indentations 42-48 form the tab attachment sections generally noted by the reference numeral 60. This feature of the present invention will be described in connection with cover 16. However, it again should be emphasized that the same construction is used in the base 14.

Figure 9:
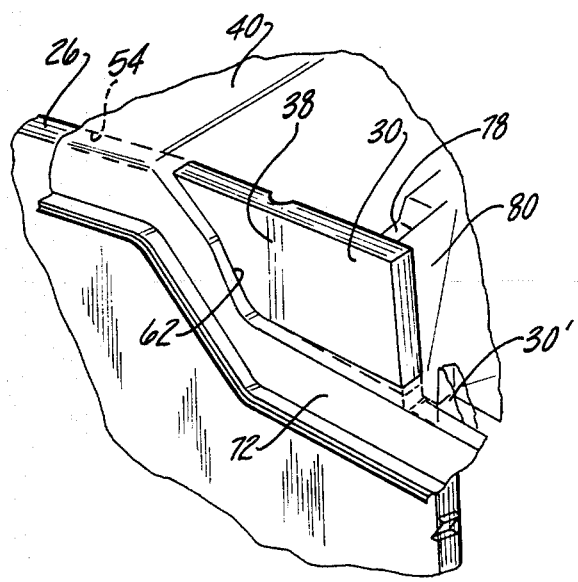
FIGS. 9-11 are partial perspective views which sequentially illustrate a method of folding the tabs of the sleeve so as to attach the sleeve to the cover or base.

Tab attachment section 60 includes a pair of transverse slots 62, 62' which are adapted to receive tabs 30, 30' respectively, in an unfolded condition as can be seen most clearly in FIG. 9. Slots 62, 62' extend transversely through the outer face 40 to the inner face 52 of cover 16. The slots lie in generally the same vertical plane defined by adjacent portions of peripheral groove 54. Slots 62 and 62' are divided by a bridge portion 64 to give the construction added rigidity. Notch 36 in each of the tab pairs provide clearance for bridge 64.

It will be appreciated that it will not always be possible to maintain the tabs in their perfect coplanar alignment with their associated walls of the sleeve 12 as shown in FIG. 2. After a period of use it is expected that the tabs will have a tendency to point inwardly about their respective fold lines 38 when the container is disassembled. Accordingly, it may become a burdensome task to manually align all of the tab pairs so that they easily pass through their respective slots in the cover 16 and base 14 when the container is assembled. It would also be desirable to maintain the flaps coplanar with their respective slots when the container is disassembled so that the cover and base may be easily lifted from the sleeve without catching one or more of the tabs which may have a tendency to retain their folded angular orientation. These potential problems are overcome by way of the aspect of the present invention which will now be described.

With particular reference to FIG. 6, the inner face 52 defining the tab attachment section 60 includes a ramp 70. Ramp 70 (which can also be seen in FIG. 2) is inclined at an angle which slopes toward the slots 62, 62'. Ramp 70 cooperates with inner portions of a vertical side flange 72 to form a v-shaped chute converging towards slots 62, 62'.

FIG. 6 shows in solid lines a tab 30 which has been bent. When the cover 16 is brought downwardly so that the tabs enter the chute, the bent tab engages the inclined ramp 70 which straightens it out and guides it through its respective slot as shown by the dotted lines. The camming action provided by way of ramp 70 thus enables the base 14 and cover 16 to be easily fitted on the edges of the sleeve 12 even though some of the tabs may have been bent.

Figure 3:
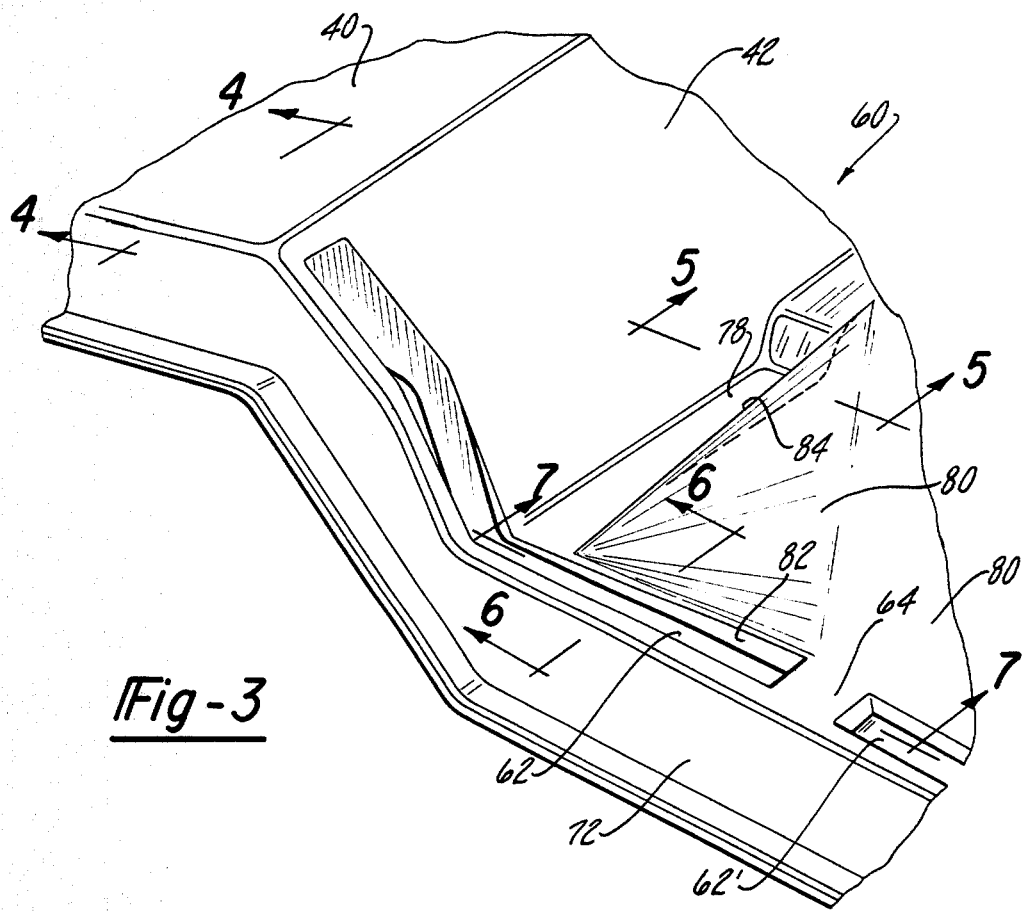
FIG. 3 is an enlarged perspective view of a portion of the cover adapted to receive tabs of the sleeve.

FIGS. 8 and 9 illustrate the initial position of the tabs once they pass through their respective slots with the top edge 26 of the sleeve 12 abutting peripheral groove 54. With additional reference to FIGS. 3, 5 and 7, tab attachment section 60 further includes a channel 78 in face 40 extending orthogonally in the horizontal plane from each of the slots beginning at the point where the fold lines 38 of the tabs are located; i.e. the intersection of the channels with their respective slots. A wedge shaped camming surface 80 is provided between each of the channel-slot intersectiona in face 40. The camming surface slopes toward the intersection of the channels and slots so that the point of the wedge is substantially in the same plane as the cut line 34 defining the bottom edge of each tab. The sides of the camming surface 80 define upstanding shoulders 82 and 84. Shoulder 84 provides one side wall for channel 78.

Figure 10:
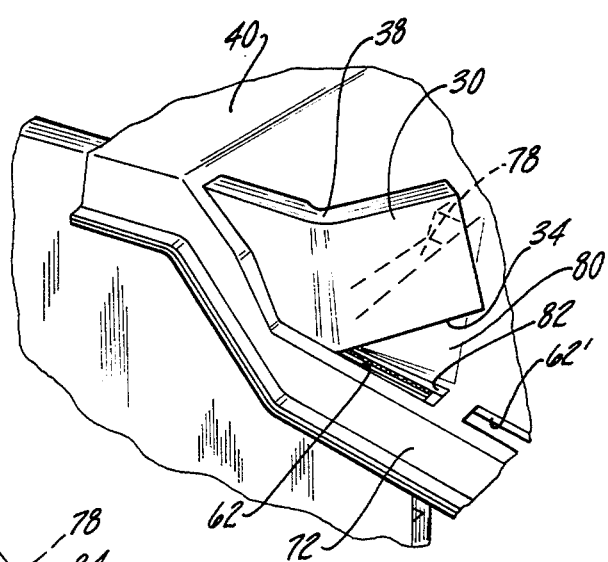
Figure 11:
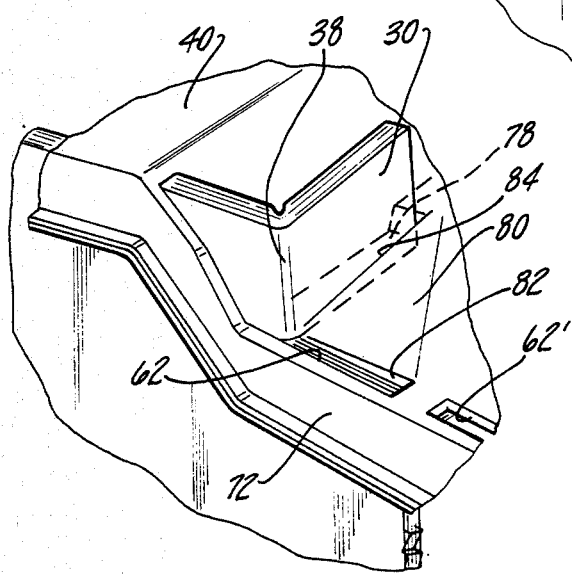

As shown in FIG. 10 the tabs are folded by lifting the distal end thereof up over shoulder 82 and bending the tab about fold line 38 until the bottom edge thereof traverses over camming surface 80 and is received within the pocket defined by channel 78. As shown in FIG. 11, the channel 78 holds the tabs securely in place since the shoulder 84 prevents the tab from returning to its original position.

When this tab attachment procedure has been performed for the base 14 it will be noted that the tabs 32 are folded underneath the base and thus securely lock the sleeve 12 thereon. The goods then may be placed within the interior of the container without fear of the sleeve shifting or falling off the base. After the goods have been placed within the open container then the cover 16 may be assembled to the sleeve 12 as noted above. It should be understood that in some applications it may not be necessary to provide a cover for the container and thus cover 16 may be eliminated.

To disassemble the base and cover from the sleeve, the procedure noted above is merely reversed. Briefly, the distal ends of the tabs are lifted to clear shoulder 84 and then folded over camming surface 80 until they become aligned with their respective wall portions of the sleeve 12. Note that the flange 72 extends beyond the bottom cut line 34 of the tabs to provide a stop for preventing the tabs from being swung outwardly too far as shown most clearly in FIG. 8. The shoulder 82 analogously prevents the tabs from returning to their folded condition toward the middle of the container. Thus, once the tabs are swung outwardly they drop down within the confines of flange 72 and shoulder 82 thereby maintaining them in alignment with their respective wall portions. Accordingly, the base or cover may be lifted from the sleeve with the tabs easily passing through their respective slots without interference.

Those skilled in the art will appreciate that the design of the present invention offers significant advantages over previous composite container designs. Among the advantages is the elimination of the requirement of banding the components together. In contrast, the container of the present invention may be assembled or disassembled quite easily without necessitating external apparatus. The containers when assembled are stackable on top of one another due to their durable design. It may be advantageous to employ some sort of interlocking structure on the bottom of the base and top of the cover to prevent lateral slippage of the stacked containers. However, this is well within the skill of the ordinary practitioner. By bringing the sleeve substantially to the floor level the container can withstand substantial compressive loads without having to use substantial amounts of plastic or additional reinforcing means when forming the base to counteract such loads. When the container is disassembled the base and cover may be easily stacked and nested within one another in a compact manner ready for use. The sleeve, likewise, may be collapsed and neatly stored when not in use. On the other hand, the relatively inexpensive corrugated sleeve material may just be thrown away if desired after a period of time. Still other advantages and modifications of the preferred embodiment of the invention will become apparent to those skilled in the art upon a study of the specification, drawings and claims.

I claim:

1. A container (10) comprising:
    a reusable pallet (14) having a plurality of slots (62) extending vertically through the pallet at spaced locations about its periphery with each slot opening at its upper end in the upper face of the pallet and opening at its lower end in a first portion of the lower face of the pallet; and a sleeve (12) having a plurality of tabs (32) formed at spaced locations along its lower edge foldable about vertical fold lines (38) and aligned with said slots (62) so that said tabs may be passed downwardly through the upper ends of said slots to a position in which the upper edges of the tabs are generally aligned with said lower face first portions whereafter the tabs may be folded inwardly underneath the pallet to juxtapose the upper edges of the tabs to said lower face first portions, with the tabs essentially perpendicular to the plane of the pallet, to thereby secure the sleeve to the pallet.

2. The container of claim 1 wherein the lower face of said pallet (14) further includes second portions (40) adapted to rest on a supporting surface for the container; said first lower face portions are raised above the level of said second lower face portions to define indentations (42-48) in said lower face (40) which are adapted to receive the skids of a forklift truck or the like and which house the folded under tabs.

3. The container of claim 2 which further comprises:
    receiving means (54) on peripheral portions of the pallet (14) extending substantially to said second lower face support portions (40), said means (54) being adapted to receive edges (28) of the sleeve (12) whereby downward compressive loads applied to the container are transferred by the sleeve substantially directly to said second lower face support portions to thereby minimize deformation of the peripheral portions of the pallet.

4. The container of claim 3 wherein said receiving means comprises a groove (54) formed in the upper face (52) of the pallet (14) substantially coplanar with said slots (62).

5. The container of claim 1 which further comprises:
    means (78) extending orthogonally to said slots (62), operative to maintain said tabs (32) in their folded condition.

6. The container of claim 5 wherein said means comprises a channel (78) formed in said first lower face portions (52) of the pallet.

7. The container of claim 1 which further comprises:
    ramp means (70) formed in the upper pallet face (52) adjacent each slot (62), operative to guide bent flaps into alignment with their respective slots (62).

8. A container (10) comprising:
    a reusable plastic pallet (14) having a plurality of transverse slots (62) located about its periphery;
    a sleeve (12) having a plurality of tabs (32) aligned with said slots (62) adapted to pass therethrough and be folded underneath portions of the pallet so that the plane of each tab is essentially perpendicular to the plane of the pallet to thereby secure the sleeve to the pallet;

a plurality of channels (78) formed in outer face portions (40) of the pallet and operative to respectively maintain said tabs (32) in their folded condition; and, abutment means (82,84) located between each of said slots (62) and channels (78), operative to maintain the tabs (32) in a first position aligned with the respective slot (62) or in a second position orthogonally thereto.

9. The container of claim 8 wherein said abutment means comprises side shoulders (82, 84) of a wedge shaped camming surface (80) sloping towards the intersection of said channel (78) and slot (62).

10. A container (10) comprising:

a generally planar base (14) providing a bottom for the container;

a sleeve (12) removably positioned on the base (14) for providing sides for the container;

said base including support faces (40) on the lower face of the base defining a downwardly facing support surface for the base adapted to rest on an upwardly facing underlying supporting surface;

upwardly opening grooves (54) formed along peripheral portions of the upper surface of the base (14) and adapted to receive lower portions of the sleeve with the lower edges (28) of said lower portions positioned at substantially the same level as said support faces; and indentation means (42–48) located inboard of corner portions of the base (14) for defining relieved access areas in sides of the base for receiving skids (50) of a forklift truck or the like;

whereby downward compressive loads applied to the container are transferred by the sleeve (12) substantially directly to the supporting surface thereby minimizing deformation of peripheral portions of the base (14).

11. The container of claim 10 wherein:

said indentations means comprise downwardly opening tunnels running laterally across the lower face of the base (14); and said container further includes coacting releasable attachment means defined on said sleeve and on said base in the vicinity of said tunnels.

12. The container of claim 11 wherein said base is made of plastic material and said sleeve is an open ended box made of corrugated material.

13. A container (10) comprising:

a generally rectangular reusable pallet (14) having a lower face (40) configured so that at least the corners of the pallet have bottom surfaces which form a downwardly facing lower support surface on the lower face of the pallet which is adapted to rest on an upwardly facing underlying supporting surface for the container, a plurality of indentations (42–48) running laterally across said lower face (40) and inboard of the corners providing relieved areas for receiving skids (50) of a forklift truck or the like; and an open ended rectangular sleeve (12) providing side walls (18–24) for the container (10) and including a plurality of tabs (32) formed in a lower edge (28) of the sleeve (12) and adapted to be folded toward the center of the sleeve (12);

said pallet (14) further including a groove (54) formed in an upper face (52) of the pallet (14) and adapted to receive the lower edge (28) of the sleeve (12), said groove (54) extending downwardly to substantially the level of said bottom surfaces (40); tab attachment sections (60) formed in peripheral portions of each of said indentations (42–48), said tab attachment sections (60) each including a slot (62) extending transversely through the pallet and substantially coplanar with said groove (54), said slots (62) being in alignment with the tabs (32) in the sleeve;

whereby the sleeve (12) may be attached to the pallet (14) by nesting the edge (28) of the sleeve in the pallet groove (54), with the tabs (32) passing through their respective slots (62) and then folding the tabs (32) underneath the indentations (42–48) toward the center of the container.

14. The container of claim 13 wherein each of said tab attachment sections (60) further includes:

a ramp (70) formed in said lower face (52) sloping towards said slot (62) and adapted to guide bent tabs (32) into alignment with their respective slots (62).

15. The container of claim 14 wherein said tab attachment sections (60) further comprises:

a channel (78) for each of the tabs (32) formed in said upper face (40) and extending generally orthogonally to said slot (62), adapted to maintain said tabs (32) in their folded condition.

16. A container (10) comprising:

a generally rectangular reusable plastic pallet (14) having an outer face (40) configured so that at least the corners of the pallet have bottom surfaces which are adapted to rest on a supporting surface for the container, a plurality of indentations (42–48) running laterally across said outer face (40) and inboard of the corners providing relieved areas for receiving skids (50) of a forklift truck or the like;

an open ended rectangular sleeve (12) made of corrugated material providing side walls (18–24) for the container (10), a plurality of tabs (32) formed in a lower edge (28) of the sleeve (12) and adapted to be folded towards middle portions of the sleeve (12);

said pallet (14) further including a groove (54) formed in an upper face (52) of the pallet (14) and adapted to receive the lower edge (28) of the sleeve (12), said groove (54) extending downwardly to substantially the level of the outer face (40);

tab attachment section (60) formed in peripheral portions of said indentations (42–48), said tab attachment section (60) each including a slot (62) extending transversely through the pallet and substantially coplanar with said groove (54), said slot (62) being in alignment with tabs (32) in the sleeve;

said tab attachment section (60) further including a ramp (70) formed in said inner face (52) sloping towards said slot (62) and adapted to guide tabs (32) into alignment with their respective slots (62);

said tab attachment section (60) further comprising a channel (78) for each of the tabs (32) formed in said outer face (40) and extending generally orthogonally to said slot (62), adapted to maintain said tabs (32) in their folded condition; and said tab attachment further comprising a wedge-like camming surface (80) sloping towards the intersection of said channel (78) and slot (62) providing shoulders (82 and 84) for maintaining said tabs (32)

in a first position in alignment with their respective sleeve walls and in a second position folded with respect thereto, whereby said sleeve (12) may be attached to the pallet (14) by nesting (28) of the sleeve in the pallet groove (54), with the tabs (32) passing through their respective slots (62) and then folding the tabs (32) underneath the indentations (42-48).

17. The container of claim 16 which further comprises:
a cover (16) being substantially the mirror image of pallet (14), with an upper edge (26) of the sleeve (12) including tabs (30) which are removably attached to the cover (16) in the same manner that tabs (30) on the lower edge (28) are attached to the pallet (14).

18. An enclosure (14,16) adapted to be removably attached to a sleeve (12) having foldable tabs (30,32) formed in an edge (26,28) thereof, said enclosure comprising:
a generally rectangular member (14,16) in which at least the corners thereof have outer face portions (40) lying in the same plane and constituting an outer support surface for said member;
elongated indentations (42-48) in the outer face (40) of said member located inboard of the corners and adapted to provide relieved areas for receiving the skids (50) of a forklift truck or the like;
receiving means (54) on peripheral portions of an inner face (52) of said member, extending to substantially the same level as said outer face portions, adapted to receive an edge (26,28) of the sleeve; and
a plurality of slots (62) extending transversely through the indentations (42-48) and adapted to receive the tabs (30,32) of the sleeve.

19. The enclosure of claim 18 wherein said member is formed of two skins of vacuum formed sheets of polyethylene fused together.

20. The enclosure of claim 18 which is adapted to provide either a pallet (14) or a cover (16) for a container (10) employing the sleeve (12) for its side walls (18-24).

21. A container according to claim 20 wherein said side walls are made of corrugated material.

22. A container including:
a reusable pallet (14) having a plurality of transverse slots (62) formed in raised indentations (42-48) located inboard of corner portions of the pallet (14) for defining relieved access areas in sides thereof for receiving skids (50) of a forklift truck of the like; and
a sleeve comprising side walls (18-24) having lower edges (28) adapted to rest on the pallet so that at least the corners of the side walls lie in substantially the same plane as a lower face (40) of the pallet (14) on which said pallet is supported and below the raised indentations (42-48), and a plurality of tabs aligned with said slots (62) adapted to pass therethrough and be folded underneath the raised indentations (42-48) in the pallet to secure the sleeve thereto.

23. A container according to claim 22 wherein said pallet (14) further includes a groove (54) formed in an upper face (52) of the pallet (14) substantially co-planar with said slots (62), and wherein portions of the lower edges (28) of the sleeve are adapted to be received within said groove (54).

* * * * *

UNITED STATES PATENT AND TRADEMARK OFFICE
CERTIFICATE OF CORRECTION

PATENT NO. : 4,550,830

DATED : November 5, 1985

INVENTOR(S) : Lyle H. Shuert

It is certified that error appears in the above-identified patent and that said Letters Patent is hereby corrected as shown below:

Face page of the patent, Item [63], Related U.S. Application Data, "November 11, 1984" should be --November 11, 1982--.

Column 1, line 24 "taken" should be --take--.

Column 3, line 45 "and" should be --the--.

Column 3, line 56 "an" should be --a--.

Column 3, line 68 "40" should be --14--.

Column 5, line 7 "intersectiona" should be --intersections--.

Column 10, line 18 "of", second occurrence, should be --or--.

Signed and Sealed this

Twenty-second Day of July 1986

[SEAL]

Attest:

DONALD J. QUIGG

Attesting Officer

Commissioner of Patents and Trademarks